United States Patent Office 3,786,009
Patented Jan. 15, 1974

3,786,009
STABILIZED POLYBUTADIENE RESIN
Delmar F. Lohr, Jr. and Edward Leo Kay, Akron, Ohio, assignors to The Firestone Tire & Rubber Company, Akron, Ohio
No Drawing. Filed Sept. 25, 1972, Ser. No. 292,063
Int. Cl. C08f 19/14
U.S. Cl. 260—23.7 M                    18 Claims

ABSTRACT OF THE DISCLOSURE

The incorporation of a combination of a metal di(hydrocarbyl) phosphoro (di- or tetra-) thioate and a metal soap into a polybutadiene resin greatly enhances the resistance thereof to thermoxidative deterioration.

FIELD OF THE INVENTION

This invention relates to butadiene polymers and copolymer resins, and more particularly to increasing the resistance of such resins to deterioration of the mechanical properties upon exposure to heat and air.

BACKGROUND OF THE INVENTION

Butadiene polymer and copolymer resins, particularly those having, in uncured state, a high proportion of butadiene units incorporated in 1,2-configuration, have come into considerable use, particularly as electrically insulating structural components, friction elements and the like. Particularly since these resins exhibit good mechanical properties, at least initially, at high temperatures, they are attractive candidates for applications in which they will be exposed to high temperatures. At temperatures above about 350° C., however, the mechanical properties of these resins tend to slowly degrade over a period of time, which excludes them from many applications for which they would otherwise be very suitable. To date, however, there does not appear to have been any successful development of enhanced heat-resistant resins of this type.

Accordingly, it is an object of this invention to increase the resistance of butadiene polymer and copolymer resins to deterioration by heat and air.

Another object is to provide such heat resistant resins which will have physical and chemical properties undiminished in comparison with these resins as heretofore supplied.

A further object is to improve the heat resistance of such resins by incorporating therein modest amounts of compounding ingredients which are inexpensive and readily available, and which present no dangers or inconvenience involving toxicity, corrosiveness or the like.

SUMMARY OF THE INVENTION

The above and other objects are secured, in accordance with this invention in compositions comprising:

|  | Parts by wt. |
|---|---|
| Polybutadiene resin | 100 |
| A metal di(hydrocarbyl) phospho (di- or tetra-) thioate | 0.5–5.0 |
| A metallic soap | 0.5–5.0 |

The composition being cured by heating with presence of:

|  | Parts by wt. |
|---|---|
| A peroxide curing agent | 0.5–6.0 |

The above ingredients are, of course, exclusive of other filling, reinforcing and compounding ingredients such as glass fiber, glass fabric, asbestos, flame resisters, and the like.

DESCRIPTION OF THE PREFERRED EMBODIMENTS

The polybutadiene resins

These may be any resins which are based on polymers of butadiene or copolymers of butadiene with up to 60%, based on the copolymers, of styrene. Also minor proportions, say up to 15% based on the copolymer of other ethylenically unsaturated compounds may be incorporated in the copolymers. These resins are usually prepared by (co) polymerizing the monomers by means of free radical or anionic catalysts to a relatively low molecular weight, say 1,000–200,000, so that they are of at least a flowable consistency. These low molecular weight (co) polymers are then incorporated with any desired fillers, reinforcing fibers or fabrics, pigments, etc. (incuding in case of the present invention, the tetrabromobenzene and/or adjuvants), peroxide or other curing agents if desired, etc., and the composite is cured under heat and pressure to produce the desired finished article.

More particularly, there have recently been developed a class of polybutadiene resins having at least 40%, and preferably at least 60% by weight, of butadiene in the polymer molecule, and having at least 80% by weight of the butadiene therein in the vinyl type of butadiene repeating unit structure. The average molecular weight (determined by intrinsic viscosity measurement) is at least 12,500 and the molecular weight distribution is such that at least 50%, and preferably 90%, of the polymer has a molecular weight above 10,000 and at least 95% has a molecular weight above 2,000. It has been found that the presence of higher proportions of lower molecular weight polymers than allowed by these limitations causes slow curing rates and poor physical properties in the cured product. For good processibility and good flow during molding the average molecular weight should be no greater than 55,000. This corresponds to an intrinsic viscosity of about 0.7 taken at 25° C. or about 0.68 taken at 30° C. The resin should also have a dilute solution viscosity of 0.2–0.7, preferably 0.3–0.6. The butadiene units are incorporated into the polymeric chain largely in the 1,2-configuration, preferably at least 80% of the butadiene units present being in this configuration. These polymers are cured by incorporating, per 100 parts of polymer, approximately 0.5–6 parts, and preferably 1.5–3.0 parts, by weight of dicumyl peroxide (or an equivalent weight of any other peroxide giving radicals of the structure $R_2(CH_3)CO$, where R independently in each occurrence represents a hydrocarbon radical of 1–20 carbon atoms), and heating the polymers, usually under pressure. The curing temperature is advantageously at least 250° F. (120° C.), preferably about 300–350° F. (150–180° C.). Generally, no advantage in the process or product is obtained by exceeding a temperature of 420° F. (215° C.). Obviously, the higher the temperature the shorter will be the curing time required. Generally at 350° F. (180° C.) a satisfactory cure is obtained in less than four minutes, and in some cases even within a few seconds. Cure times of more than four minutes usually provide no added advantage. Where fast cures are desired it is necessary to use a filler to avoid crazing or cracking. A filler, such as silica, is advantageously used in the proportion of 25–65, preferably 40–60, volume percent based on the combined resin-filler composition. Also the resins may be incorporated with glass fiber, either as chopped filler or else as glass fabric in a laminate, in which case the glass fiber will serve the purpose of a filler in preventing crazing and cracking on fast cures.

The metallic soap

This may be any metallic salt and preferably a Group II–A or II–B metal salt (see "Handbook of Chemistry and Physics," 43rd ed., The Chemical Rubber Publishing Co., 1961, pages 448 and 449) of a higher fatty acid containing from 8 to 26 carbon atoms such as calcium 2-ethyl-hexanoate, calcium octoate, calcium laurate, calcium myristate, calcium stearate, calcium palmitate, calcium oleate, calcium arachidate, calcium abietate, magnesium stearate, magnesium octoate, magnesium oleate, zinc stearate, zinc oleate, zinc laurate, zinc abietate, cadmium stearate, and the like, and mixtures of any two or more of such salts in any proportions.

The metal di(hydrocarbyl)phosphoro (di- or tetra-) thioates

These may be any compounds of the formula (I) 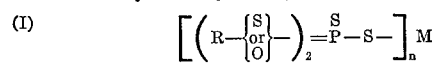

where

R, independently in each occurrence, is a hydrocarbyl radical containing 1–25 carbon atoms
M is a polyvalent metal, preferably zinc or cadmium
$n$ = the valence of the metal M

indicates either oxygen (in the case of dithioates) or sulfur (tetrathioates) bridging R and P and the remainder of the formula follows conventional chemical notation.

Examples of hydrocarbyl radicals which may occupy the situation indicated at R in Formula I are simple aliphatic hydrocarbon radicals such as ethyl, n-propl, isopropyl, n-butyl, isobutyl, t-butyl, 2-ethyl hexyl, n-dodecyl, the mixed radicals derived from petroleum fractions or the reduction of natural fatty glycerides such as coconut oil or tallow, cycloaliphatic radicals such as cyclohexyl, methyl cyclohexyl, the reduction products of naval stores, aromatic radicals such as phenyl, o-, p- and m-toluyl, naphthyl and aralkyl radicals such as benzyl, phenylethyl and the like. Metals which form the component M in Formula I may be any di- or trivalent metals, particularly those of Group II–B and Groups VIII of the Periodic Chart of the Elements (Handbook of Chemistry and Physics, 43rd ed., The Chemical Rubber Publishing Co., 1961, pages 448 and 449), and particularly zinc, cadmium, copper, manganese, cobalt, iron and nickel. Specific suitable compounds include, for instance, zinc diisopropyl phosphorodithioate, cadmium diisopropyl phosphorodithioate, zinc di(sec-butyl) phosphorodithioate, zinc diisobutyl phosphorodithioate, cadmium diisobutyl phosphorodithioate, zinc di(cyclohexyl) phosphorodithioate, cadmium di(o-toluyl) phosphorodithioate, zinc dibenzyl phosphorodithioate, zinc di(2-ethyl hexyl) phosphorotetrathioate, zinc di(1,3-dimethylbutyl) phosphorodithioate, $Cu^{II}$ (1,3-dimethylbutyl) phosphorodithioate, $Mn^{II}$(1,3-dimethylbutyl) phosphorodithioate, $Co^{II}$(1,3-dimethyl) phosphorodithioate, $Fe^{III}$(1,3-dimethylbutyl) phosphorodithioate, $Ni^{II}$(1,3-dimethylbutyl) phosphorodithioate, and the like.

The cured resins

The cured resins produced in accordance with this invention have exceptional resistance to deterioration of physical properties, particularly modulus and flexural strength, upon long time exposure at high temperatures, i.e., temperatures above 400° F. and up to 700° F. Thus, the products, upon exposure to temperatures of 400° F. for 1000 hours, or 600° F. for 100 hours, will retain upwards of 80% of their modulus and upwards of 60% of their flexural strength. The resins are therefore applicable in many situations where heat exposure is a factor, as in structural electrical components, cooking utensil handles, and automobile engine compartment components.

With the foregoing general discussion in mind, there are given herewith detailed experimental examples of the practice of this invention. All parts and percentages given are on the basis of weight, unless otherwise explicitly stated.

EXAMPLE I

| | Parts by wt. |
|---|---|
| Polybutadiene [1] | 100 |
| Silica | 380 |
| Vinyl triacetoxysilane | 3 |
| Dicumyl peroxide | 3 |
| Hexane | 150 |
| Calcium stearate (per Table I) | 0.5–5.0 |
| Metal di(hydrocarbyl) phosphorodithioate (Nature per Table I) | 0–5.0 |

[1] 90% of butadiene units in 1,2-configuration; molecular weight parameters $M_w = 29,000$, $M_n = 23,000$, DSV = 0.3.

A series of compositions was made up in accordance with the above schedule, varying the calcium stearate and phosphorodithioate in the several compositions as indicated in Table I. In the case of each composition, all of the ingredients, in the proportions selected for that composition, were thoroughly mixed together, and the mixture poured into an evaporating dish to the depth of 0.5 inch. The dish was then placed in a vacuum oven, where the hexane was removed at 125° F. under a pressure of 1–5 mm. of mercury absolute. Each such dried composition was then removed and broken up, and molded in a compression mold into several test bars 1" x 3" x 0.1". Temperature of molding was 350° F., total load on the die was 10–20 tons normal to the 1" x 3" face, and time was four minutes. The modulus and flexural strength was determined upon control bars from each composition, and the average recorded in Table I with the notation "unexposed" to indicate that these bars were not exposed to heat degradation. Other bars of each composition were exposed in an air oven at 600° F. for 100 hours, and the modulus and flexural strength determined and also recorded in Table I, with the notation "exposed." Following are the results.

TABLE I

| Run number | Calcium stearate | Phosphorodithioate Type | Amount | Heat and air exposure | Flexural strength P.s.i. | Percent retention |
|---|---|---|---|---|---|---|
| 1 | 0.50 | | 0 | Unexposed | 10,000 | |
| 2 | | | | Exposed | 1,700 | 17 |
| 3 | | | 0 | Unexposed | 10,400 | |
| 4 | | | | Exposed | 3,400 | 33 |
| 5 | | | 1 | Unexposed | 11,400 | |
| 6 | 1.00 | Zinc di-(cyclohexyl)phosphorodithioate | | Exposed | 8,800 | 85 |
| 7 | | | 2 | Unexposed | 10,400 | |
| 8 | | | | Exposed | 10,300 | 99 |
| 9 | | | 3 | Unexposed | 12,000 | |
| 10 | | | | Exposed | 10,000 | 83 |
| 11 | 2.00 | | 0 | Unexposed | 11,400 | |
| 12 | | | | Exposed | 7,000 | 61 |

TABLE I.—Continued

| Run number | Stabilizing ingredients (parts by weight) | | | Heat and air exposure | Flexural strength | |
|---|---|---|---|---|---|---|
| | Calcium stearate | Phosphorodithioate | | | P.s.i. | Percent retention |
| | | Type | Amount | | | |
| 13 | 3.00 | | 0 | Unexposed | 10,700 | |
| 14 | | | | Exposed | 7,200 | 67 |
| 15 | | | 0.50 | Unexposed | 11,900 | |
| 16 | | | | Exposed | 8,100 | 68 |
| 17 | | | 1.00 | Unexposed | 11,300 | |
| 18 | | | | Exposed | 9,100 | 81 |
| 19 | | Zinc di-(cyclohexyl)phosphorodithioate | 2.00 | Unexposed | 12,200 | |
| 20 | | | | Exposed | 10,300 | 85 |
| 21 | | | 3.00 | Unexposed | 11,300 | |
| 22 | | | | Exposed | 10,100 | 90 |
| 23 | | | 4.00 | Unexposed | 10,500 | |
| 24 | | | | Exposed | 8,900 | 85 |
| 25 | | | 5.00 | Unexposed | 10,300 | |
| 26 | | | | Exposed | 9,800 | 95 |
| 27 | | Zinc diisopropyl phosphorodithioate | 3.00 | Unexposed | 10,800 | |
| 28 | | | | Exposed | 9,200 | 85 |
| 29 | | Cadmium diisopropyl phosphorodithioate | 3.0 | Unexposed | 11,400 | |
| 30 | | | | Exposed | 8,600 | 75 |
| 31 | | Zinc-di(sec-butyl)phosphorodithioate | 3.00 | Unexposed | 10,400 | |
| 32 | | | | Exposed | 7,900 | 76 |
| 33 | | Zinc diisobutyl phosphorodithioate | 3.00 | Unexposed | 12,500 | |
| 34 | 3.00 | | | Exposed | 7,400 | 59 |
| 35 | | Cadmium diisobutyl phosphorodithioate | 3.00 | Unexposed | 11,300 | |
| 36 | | | | Exposed | 7,500 | 66 |
| 37 | | MnII di(1,3-dimethylbutyl) phosphorodithioate | 1.00 | Unexposed | 12,300 | |
| 38 | | | | Exposed | 10,400 | 86 |
| 39 | | CoII di(1,3-dimethylbutyl) phosphorodithioate | 1.00 | Unexposed | 12,000 | |
| 40 | | | | Exposed | 10,400 | 87 |
| 41 | | FeIII tri(1,3-dimethylbutyl) phosphorodithioate | 1.00 | Unexposed | 9,200 | |
| 42 | | | | Exposed | 10,300 | 112 |
| 43 | | NIIII di(3,1-dimethylbutyl) phosphorodithioate | 1.00 | Unexposed | 10,600 | |
| 44 | | | | Exposed | 11,000 | 104 |
| 45 | 4.00 | | 0 | Unexposed | 11,900 | |
| 46 | | | | Exposed | 7,600 | 64 |
| 47 | 5.00 | | 0 | Unexposed | 10,500 | |
| 48 | | | | Exposed | 7,100 | 68 |

EXAMPLE II

Phosphorotetrathioates

| | Parts by wt. |
|---|---|
| Polybutadiene (as in Example I) | 100 |
| Silica | 380 |
| Vinyl triacetoxy silane | 3 |
| Dicumyl peroxide | 3 |
| Hexane | 150 |
| Calcium stearate (per Table II) | 1.0–3.0 |
| Zinc dioctyl phosphorotetrathioate (per Table II) | 0.5–3.0 |

A series of compositions was made up in accordance with the foregoing schedule, varying the calcium stearate and zinc dioctyl phosphorotetrathioate as indicated in Table II. The mixing, molding and testing procedure of Example I was followed in the case of each composition. Set forth herewith in Table II are the results.

TABLE II

| Run number | Stabilizing ingredients (parts by weight) | | Flexural strength | | |
|---|---|---|---|---|---|
| | Calcium stearate | Zinc dioctyl phosphorotetrathioate | Unexposed | Exposed | Percent retained |
| 49 | | 1.0 | 11,200 | 6,200 | 55 |
| 50 | 1.0 | 1.0 | 10,100 | 8,900 | 88 |
| 51 | 2.0 | 2.0 | 11,700 | 9,500 | 81 |
| 52 | | .5 | 11,000 | 7,400 | 67 |
| 53 | 3.0 | 1.0 | 10,100 | 8,600 | 85 |
| 54 | | 2.0 | 11,600 | 11,100 | 96 |
| 55 | | 3.0 | 10,600 | 9,400 | 88 |

EXAMPLE III

Zinc and magnesium fatty acid salts

| | Parts by wt. |
|---|---|
| Polybutadiene (as in Example I) | 100 |
| Silica | 380 |
| Vinyl triacetoxy silane | 3 |
| Dicumyl peroxide | 3 |
| Hexane | 150 |
| Metallic stearate (magnesium or zinc, per Table III) | 2.96–3.10 |
| Zinc dialkyl phosphorodithioate (alkyl group per Table III) | 1.00–2.00 |

A series of compositions was made up in accordance with the foregoing schedule varying the types and amounts of the metallic stearates and zinc dialkyl phosphorodithioates in the several compositions as indicated in Table III. The mixing, molding and testing procedure of Example I was followed in the case of each composition. Set forth herewith in Table III are the results.

TABLE III

| Run No. | Zinc dialkyl phosphorodithioate used | | Metal stearate used | | Heat and air exposure | Flexural strength | |
|---|---|---|---|---|---|---|---|
| | Type | Amount | Type | Amount | | P.s.i. | Percent retention |
| 56 | | 0 | Magnesium | 2.96 | Unexposed | 10,500 | |
| 57 | | | | | Exposed | 8,400 | 80 |
| 58 | | | Zinc | 3.10 | Unexposed | 10,100 | |
| 59 | | | | | Exposed | 7,900 | 78 |
| 60 | | 1.0 | Magnesium | 2.96 | Unexposed | 11,700 | |
| 61 | | | | | Exposed | 10,100 | 86 |
| 62 | Zinc di-(n-hexyl)-phosphorodithioate | 2.0 | do | 2.96 | Unexposed | 9,100 | |
| 63 | | | | | Exposed | 8,800 | 97 |
| 64 | | 1.0 | Zinc | 3.10 | Unexposed | 10,700 | |
| 65 | | | | | Exposed | 9,000 | 84 |
| 66 | | 2.0 | do | 3.10 | Unexposed | 8,800 | |
| 67 | | | | | Exposed | 9,500 | 108 |
| 68 | Zinc di-(n-octyl)-phosphorodithioate | 2.0 | do | 3.10 | Unexposed | 11,000 | |
| 69 | | | | | Exposed | 9,700 | 88 |

What is claimed is:

1. Process of producing a heat-stabilized resin, which process comprises subjecting to curing temperature a composition containing

| | Parts by wt. |
|---|---|
| A butadiene polymer or copolymer resin | 100 |
| A metal di(hydrocarbyl)phosphoro (di- or tetra-) thioate | 0.5–5.0 |
| A metallic soap | 0.5–5.0 |
| A peroxide curing agent | 0.5–6.0 | the resin being a homopolymer of butadiene or a copolymer of butadiene and styrene and containing at least 40 percent by weight of butadiene, and at least 80 percent of the butadiene repeating units in the polymer or copolymer being in the 1,2-configuration, the metallic soap being a calcium salt of a fatty acid containing 8 to 26 carbon atoms and the peroxide being one which gives radicals of the $R_2(CH_3)CO\cdot$ in which R represents a hydrocarbon radical of 1 to 20 carbon atoms.

2. Process according to claim 1, wherein proportions of metal di(hydrocarbyl) phosphoro (di- or tetra-) thioate and metallic soap are more particularly

| | Parts by wt. |
|---|---|
| Metal di(hydrocarbyl) phosphoro (di- or tetra-) thioate | 1.5–3.0 |
| Metallic soap | 2.0–3.5 |

3. Process according to claim 1, wherein the metal component of the metal di(hydrocarbyl) phosphoro (di- or tetra-) thioate is zinc, cadmium, copper, manganese, cobalt, iron or nickel.

4. Process according to claim 1, wherein the composition further contains a silica filler and a vinyl silane.

5. Process according to claim 3 wherein the metal component of the metal di(hydrocarbyl) phosphoro (di- or tetra-) thioate is zinc.

6. Process according to claim 3, wherein the metal component of the metal di(hydrocarbyl) phosphoro (di- or tetra-) thioate is cadmium.

7. A composition curable to a heat-stabilized resin comprising

| | Parts by weight |
|---|---|
| A butadiene polymer or copolymer resin | 100 |
| A metal di(hydrocarbyl)phosphoro (di- or tetra-) thioate | 0.5–5.0 |
| A metallic soap | 0.5–5.0 |
| A peroxide curing agent | 0.5–6.0 | the resin being a homopolymer of butadiene or a copolymer of butadiene and styrene and containing at least 40 percent by weight of butadiene, and at least 80 percent of the butadiene repeating units in the polymer or copolymer being in the 1,2-configuration, the metallic soap being a calcium soap of a fatty acid containing 8 to 26 carbon atoms and the peroxide being one which gives radicals of the structure $R_2(CH_3)CO\cdot$ in which R represents a hydrocarbon radical of 1 to 20 carbon atoms.

8. Composition according to claim 7, wherein the proportion of metal di(hydrocarbyl) phosphoro (di- or tetra-) thioate and metal soap are more particularly

| | Parts by wt. |
|---|---|
| Metal di(hydrocarbyl) phosphoro (di- or tetra-) thioate | 1.5–3.0 |
| Metal soap | 2.0–3.5 |

9. Composition according to claim 7, wherein the metal component of the metal di(hydrocarbyl) phosphoro (di- or tetra-) thioate is zinc, cadmium, copper, manganese, cobalt, iron or nickel.

10. Composition according to claim 7, wherein the metal component of the metal di(hydrocarbyl) phosphoro (di- or tetra-) thioate is zinc.

11. Composition according to claim 7, wherein the metal component of the metal di(hydrocarbyl) phosphoro (di- or tetra-) thioate is cadmium.

12. Composition according to claim 1, which further contains a silica filler and a vinyl silane.

13. A peroxide-cured heat-stabilized resin, said resin containing therein

| | Parts by wt. |
|---|---|
| A cured butadiene polymer or copolymer resin | 100 |
| A metal di(hydrocarbyl)phohsphoro (di- or tetra-) thioate | 0.5–5.0 |
| A metal soap | 0.5–5.0 | the resin being a homopolymer of butadiene or a copolymer of butadiene and styrene and containing at least 40 percent by weight of butadiene, and at least 80 percent of the butadiene repeating units in the polymer or copolymer being in the 1,2-configuration, the metallic soap being a calcium soap of a fatty acid containing 8 to 26 carbon atoms, and the peroxide being one which gives radicals of the structure $R_2(CH_3)CO\cdot$ in which R represents a hydrocarbon radical of 1 to 20 carbon atoms.

14. Cured resin according to claim 13, wherein the proportions of metal di(hydrocarbyl) phosphoro di- or tetra-) thioate and of metal soap are more particularly

| | Parts by wt. |
|---|---|
| Metal di(hydrocarbyl) phosphoro (di- or tetra-) thioate | 1.5–3.0 |
| Metal soap | 2.0–3.5 |

15. Cured resin according to claim 13, wherein the metal component of the di(hydrocarbyl) phosphoro (di- or tetra-) thioate is zinc, cadmium, copper, manganese, cobalt, iron or nickel.

16. Cured resin according to claim 13, wherein the metal component of the di(hydrocarbyl) phosphoro (di- or tetra-) thioate is zinc.

17. Cured resin according to claim 13, wherein the metal component of the di(hydrocarbyl) phosphoro (di- or tetra-) thioate is cadmium.

18. A cured resin according to claim 13, wherein the resin further contains a silica filler and a vinyl silane.

References Cited
UNITED STATES PATENTS

| 3,703,491 | 11/1972 | Takayama | 260—23.7 R |
|---|---|---|---|
| 3,308,103 | 3/1967 | Coran | 260—79.5 |
| 3,511,795 | 5/1970 | Brodic | 260—23.7 R |

PHILIP E. ANDERSON, Primary Examiner

W. E. PARKER, Assistant Examiner

U.S. Cl. X.R.

260—45, 75 C, 79.5 R

UNITED STATES PATENT OFFICE
CERTIFICATE OF CORRECTION

Patent No. 3,786,009    Dated January 15, 1974

Inventor(s) Delmar F. Lohr, Jr. and Edward Leo Kay

It is certified that error appears in the above-identified patent and that said Letters Patent are hereby corrected as shown below:

In Column 2, Line 18, "incuding" should be --including--.

In Column 3, Line 20 of the first formula

"$\begin{matrix} S \\ P \end{matrix}$" should be --$\begin{matrix} S \\ \| \\ P \end{matrix}$--

In Column 3, Line 31,
"and the remainder of the formula" etc. should be set out thusly:

--and   the remainder of the formula--.

In Column 3, Line 36, "n-propl" should be --n-propyl--.

In Column 4, Line 2, "dimethyl)" should be --dimethylbutyl)--.

In Column 4, Line 31, "(per Table I)." should have been placed under --0.5 - 5.0-- in the column marked "Parts by wt."

In Column 4, in the footnotes after Example I, "Mw and Mn" should be --$M_w$ and $M_n$--.

In Column 5, Run No. 27 "Enexposed" should be --Unexposed--.

In Column 5, Run No. 37 "MnII" should be --$Mn^{II}$--.

In Column 5, Run No. 39 "CoII" should be --$Co^{II}$--.

In Column 5, Run No. 41 "FeIII" should be --$Fe^{III}$--.

UNITED STATES PATENT OFFICE
CERTIFICATE OF CORRECTION

Patent No. 3,786,009  Dated January 15, 1974

Inventor(s) Delmar F. Lohr, Jr. and Edward Leo Kay

It is certified that error appears in the above-identified patent and that said Letters Patent are hereby corrected as shown below:

PAGE 2 - CORRECTIONS

In Column 5, Run No. 43 "NIIII" should be $Ni^{II}$--.

In Column 5, Run No. 43 "(3.1-" should be --(1,3- --.

In Column 5, Example II, Line 40, "per Table II" should be under the figures --1.0-3.0--.

In Column 5, Table II, Run No. 49 should have the figure "1.0" beneath the column "Calcium Stearate".

In Column 5, Table II, Run No. 50, Under the column "Calcium Stearate" the figure "1.0" should be --2.0--.

In Column 6, Example III, Line 49, "per Table III" should be beneath the figures --2.96 - 3.10--.

In Column 6, Example III, Line 51, "per Table III" should be beneath the figures --1.00 - 2.00--.

IN THE CLAIMS

Claim 1, Line 18 after the word "the" the word --structure-- should be inserted.

Claim 14, Line 2, insert a parenthesis ( before --di- or tet- --.

Signed and sealed this 17th day of December 1974.

(SEAL)
Attest:

McCOY M. GIBSON JR.  
Attesting Officer

C. MARSHALL DANN  
Commissioner of Patents